United States Patent [19]
Maruyama

[11] 3,847,768
[45] Nov. 12, 1974

[54] RADIATION-CURABLE COATING COMPOSITION

[75] Inventor: Tsutomu Maruyama, Hiratsuka, Japan

[73] Assignee: Kansai Paint Company, Limited, Hyogo-ken, Japan

[22] Filed: June 4, 1971

[21] Appl. No.: 150,219

[30] Foreign Application Priority Data
June 8, 1970 Japan.............................. 45-48699

[52] U.S. Cl............ 204/159.14, 117/93, 117/93.31, 117/132 B, 117/148, 117/138.8 A, 204/159.24, 260/836, 260/865, 260/901, 260/885

[51] Int. Cl........................... C08f 1/16, C08f 27/00
[58] Field of Search................. 204/159.14, 159.24; 260/DIG. 24, 45.9 R; 252/8.1; 117/93.31

[56] References Cited
UNITED STATES PATENTS
3,616,366   10/1971   Passalenti et al............. 204/159.15
2,536,978   1/1951   Fordemwalt................. 260/DIG. 24
2,690,393   9/1954   McGarvey................... 260/DIG. 24

FOREIGN PATENTS OR APPLICATIONS
792,016   3/1958   Great Britain

Primary Examiner—Wilbert J. Briggs, Sr.
Attorney, Agent, or Firm—Ostrolenk, Faber, Gerb & Soffen

[57] ABSTRACT

A coating composition characterized in that an ordinary coating composition which can be cured by applying ionizing radiation, is mixed with at least one compound having the general formula:

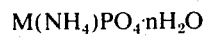

$$M(NH_4)PO_4 \cdot nH_2O$$

wherein M is an element selected from the group consisting of magnesium, calcium and strontium, and $n$ is zero or a positive integer from 1 to 10.

5 Claims, No Drawings

RADIATION-CURABLE COATING COMPOSITION

The present invention relates to a coating composition, and more particularly to a radiation-curable coating composition.

In the methods of curing a coating composition in the form of film on surfaces of coated articles, it is well known that the irradiation curing method of ionizing radiation has been used. This method has been developed recently, and there are several advantages in such method as compared with the conventional baking in a heating oven. For example, the curing time is shortened, the coating line in a factory does not occupy a relatively large space, and the curing process can be carried out without a heating step.

In order to fully enjoy such advantageous features of the irradiation curing method using ionizing radiation for curing a film formed by a coating composition, it is necessary to prepare and install a high power ionizing radiation apparatus with a large capacity. It is very expensive to install such apparatus. Therefore, how to minimize efficiently the dose of ionizing radiation, in order to improve the productivity and thereby lower the production and running costs even with such expensive apparatus has been a serious problem to be solved in this technical field.

It is, therefore, one object of the present invention to provide a novel radiation-curable coating composition, a film or films of which can be cured in a shorter time by applying ionizing radiation.

Another object of the present invention is to provide a radiation-curable coating composition, a film or films of which can be cured quickly by applying a smaller dose of ionizing radiation for efficient utilization of the irradiation curing method and apparatus.

A further object of the present invention is to provide a radiation-curable coating composition, a film or films formed by such coating composition having good film properties, improved abrasion and solvent resistance, and fire retardance.

These as well as other objects of the present invention will become apparent when reading the accompanying description.

According to the present invention, the coating composition of the present invention comprises the ordinary coating composition and a certain compound, in which said certain compound has the general formula:

$$M(NH_4)PO_4 \cdot nH_2O$$

wherein M is a metal element selected from the group of Mg, Ca and Sr, and $n$ is zero or a positive integer from 1 to 10, and said compound is hereinafter referred to as "Compound A."

In the preparation of the coacting composition of the present invention, the ordinary coating compositions curable by irradiation can be used. For example, the available coating compositions are those which contain, as vehicle component, a resin composition having ethylenically unsaturated bonds such as unsaturated polyester resin, unsaturated acrylic resin, unsaturated epoxy resin and polybutadiene resin.

The ratio of the compound A to the above resin composition as solid is in the range of 1 wt to 40 wt percent, and is preferably in the range of 5 wt to 30 wt percent. If there is less than said amount, the curing rate is inferior. If there is more than said amount, the gloss of formed film is inferior. When clear products are desired, the ratio of the Compound A to the resin composition as solid may be in the range of 1 wt to 20 wt percent, because the transparency of the coated film is decreased by mixing a large amount of the Compound A. To disperse Compound A into the above resin composition, the conventional dispersing apparatus such as pebble mill, roll mill, steel mill, sand mill, paint conditioner and the like can be employed.

The coating composition prepared in the present invention is then applied on the surfaces of articles such as wood, metal and synthetic plastic products, and thereafter said coated articles are subjected to ionizing radiation, the thus formed film on surfaces of said articles is cured in a short time.

As the ionizing radiation usable, electron beam, alpha ray, beta ray, gamma ray, accelerated electron beam, X-ray and deutron beam are effective, in which said accelerated electron beam, beta ray and gamma ray are commonly employed. There are used various electron accelerator, strontium 90, cobalt 60, cesium 137 and the like as the sources of the ionizing radiations.

The refractive index of Compound A, for example, $Mg(NH_4)PO_4 \cdot nH_2O$, 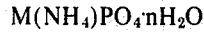 $Ca(NH_4)PO_4 \cdot nH_2O$ and $Sr(NH_4)PO_4 \cdot nH_2O$ used in the present invention, is close to that of the vehicle of the paint. Therefore if these kinds of Compound A are used in the preparation of the coating composition, the transparency of the composition is not decreased. Accordingly, Compound A of the invention is conveniently used for clear products, to say nothing of enamel. By using Compound A in the coating composition, the coated film is cured faster than the ordinary coating composition, and consequently, the dose of ionizing radiation can be remarkably reduced. Furthermore, the obtained coating film has good film properties and is very much improved in abrasion resistance and solvent resistance since the coated film is a cured hard. In addition, since Compound A is a phosphate, the coated films have fire-retardant.

As disclosed in the above, a smaller dose of ionizing radiation is sufficient for curing of the coating composition of the present invention compared with that of the ordinary radiation-curable coating composition. Therefore, the curing time can be cut down and the most efficient use of the expensive radiation installation can be made. Accordingly, the productivity of the coating line is elevated and the production costs can be greatly reduced.

The curing time of the coating composition of the present invention varies according to the kind of coating composition used and to the source of the radiation. However, it can be cured within the range of several seconds to several minutes. When a high power electron accelerator is used as the radiation source, the curing of the coated film can be completed in less than several seconds, and it is therefore suitable for a high speed curing process.

The coating composition obtained in the present invention can be advantageously used for several uses such as paints for coil coating, for plywood, for plastics, etc., where ordinary coating compositions are employed.

The various features and advantages of the invention may be more fully understood from the following examples, however the specific embodiments as disclosed herein are intended as merely illustrative and in no way restrictive of the invention. In the descriptions of the invention, all parts and percentages are by weight unless otherwise indicated.

EXAMPLE 1

An unsaturated polyester resin was prepared by means of the common method of condensation by heating in which 0.6 mol fumaric acid, 0.4 mol of tetrahydrophthalic anhydride, 8.05 mol of propylene glycol and 0.2 mol of diethylene glycol were charged to react. The acid value of the obtained resin was 38. Into 120 parts of the thus obtained unsaturated polyester resin, 0.02 parts of hydroquinone and 80 parts of styrene monomer were dissolved uniformly to obtain an unsaturated polyester resin composition (hereinafter referred to as "Control I"). Then, each 5 parts of $Mg(NH_4)PO_4 \cdot 6H_2O$, $Ca(NH_4)PO_4 \cdot 7H_2O$ and $Sr(NH_4)PO_4$ was dispersed into each 100 parts of said Control I, and each of them was dispersed for an hour by using a paint conditioner to obtain a coating composition of unsaturated polyester resin of the present invention. Hereinafter, the composition being dispersed with $MG(NH_4)PO_4 \cdot 6H_2O$ is referred to as "Sample A," dispersed with $Ca(NH_4)PO_4 \cdot 7H_2O$ as "Sample B" and the one dispersed with $Sr(NH_4)PO_4$ as "Sample C".

The Sample A, Sample B, Sample C and Control I were applied respectively on clean glass plates to form 100 micron coating films. The surfaces of the coatings were covered with cellulose films in order to intercept the air. Then, the coatings were cured by a transformer type electron accelerator under the conditions of 300 Kev of the electron beam energy, 25 mA of the electron beam current, and doses of 2 Mrad, 4 Mrad and 6 Mrad. These cured films were peeled off and the gel fractions thereof measured by acetone extraction.

The results of the above are shown in the following Table 1.

TABLE 1

| Samples<br>Dose of<br>Irradiation | Gel Fraction (*1) | | | |
|---|---|---|---|---|
| | Sample A | Sample B | Sample C | Control I |
| 2 Mrad | 58.3% | 55.2% | 56.2% | 31.4% |
| 4 Mrad | 82.3% | 81.9% | 81.5% | 52.8% |
| 6 Mrad | 92.1% | 90.1% | 91.8% | 75.4% |

Note:
(*1) Measurement of Gel Fraction

The hardened coating film cured with the above condition was peeled off the glass plates and was weighed in a container made of 300 mesh stainless steel wire net. Then, it was extracted with acetone for 18 hours using Soxhlet's extractor, and thereafter it was dried at 110°C for 3 hours. The net container is then weighed to calculate Gel Fractions in accordance with the following equation:

Gel Fraction (%) = Weight of Sample after extraction/Weight of Sample before extraction × 100

As disclosed in the above, each of the Samples A, B and C contained one of Compound A. Therefore, the weight of Compound A was subtracted as insoluble previously in the calculation.

As will be understood from the results shown in Table 1, the amount of curing of the coatings containing $MG(NH_4)PO_4 \cdot 6H_2O$, $Ca(NH_4)PO_4 \cdot 7H_2O$ and $Sr(NH_4)PO_4$ are much larger than that of Control I (the ordinary paint composition).

EXAMPLE 2

Each 100 parts of the compositions as prepared in Example 1, i.e., Sample A, Sample B, Sample C and Control I, was mixed with 1 part of a solution containing 40 parts of cobalt naphthenate and 60 parts of toluene. These samples are hereinafter referred to as Sample A', Sample B', Sample C' and Control I', respectively. Each coating was applied to a 60 microns thickness on the surface of a lauan plywood plate 12 mm thick, where the surface of said plate was previously treated with wood filler. Onto the coated surface, a dose of 7 Mrad radiation was applied by the transformer type electron accelerator under the same conditions as in Example 1.

The results of the tests of the obtained coating films are shown in Table 2.

Table 2

| Tests | Sample A' | Sample B' | Sample C' | Control I' |
|---|---|---|---|---|
| Pencil Harness (*2) | 3H | 3H | 3H | H |
| Adhesion (*3) | Good | Good | Good | Good |
| Stain Resistance (*4) | Good | Good | Good | Slightly stained |
| Thermocycle Resistance (*5) | Good | Good | Good | Good |
| Abrasion Resistance (*6) | 51mg / 100 cycles | 52mg / 100 cycles | 56mg / 100 cycles | 98mg / 100 cycles |

Notes:
(*2) Measured by the same manner as JIS K 5652-1966. (JIS: Japanese Industrial Standard)
(*3) A test plate in the size of 50 × 100 × 12 mm was prepared, and coated and cured in the manner disclosed in Example 2. Diagonal cuts on the surface of the thus prepared test piece were made with a knife such that said cuts reached the base plate. On each of the cuts, Scotch tape was attached and then peeled off in 180° counter direction. Thereafter, the appearance of the coating film was observed with the naked eye.
(*4) The surface of coated test piece was applied with a lipstick (Kiss Me Super No. 3: Trade name), and then was kept still for 4 hours at 20°C. Thereafter, the test piece was wiped with a soft cloth, and the stains remaining on the surface were observed with the naked eye.
(*5) The coated test piece was put in an oven equipped with a thermostat at 50°C for 2 hours, and thereafter the piece was transferred to a constant temperature refrigerator at −20°C for 2 hours. The above cycle was repeated and after the ten cycles, the condition of the coating film was observed with the naked eye.
(*6) Measured by the same manner ASTM D1175-55T. Taber abraser instrument and a 500 gram load were used and each of the abrasion tests of the coated surface was made by 100 cycles, and thereafter the loss in weight of the coating was measured.

EXAMPLE 3

Acrylic resin of 25 percent of β-hydroxyethyl methacrylate, 29 percent of styrene, 20 percent of methyl methacrylate, and 26 percent of n-butyl methacrylate was prepared by means of the commonly known method. 100 parts of the obtained acrylic resin was reacted with 20 parts of a reaction product of the equimolar amounts of tolylenediisocyanate and β-hydroxyethyl methacrylate, to obtain an unsaturated acrylic resin in a common method. Into 120 parts of the thus obtained unsaturated acrylic resin, methyl methacrylate was added and dissolved until the mixture (hereinafter referred to as Control II), reached to a viscosity of 3 centipoises at 20°C.

Into 100 parts of this Control II (non-volatiles 33 percent), 5.0 gram of $Mg(NH_4)PO_4$ was admixed and dispersed by a pebble mill for 10 hours to obtain an unsaturated acrylic resin paint composition (hereinafter referred to as Sample D).

Control II and Sample D were applied on lauan plywood plates of 26 mm thick to form coating films having 40 micron thickness, where said lauan plywood plates were previously treated with wood filler. The coating films thus obtained were applied with 4 Mrad irradiation in nitrogen gas by the transformer type electron accelerator in like manner as Example 1. The results of the tests with regard to the cured coating films are shown in the following Table 3.

Table 3

| Tests | Sample D | Control II |
|---|---|---|
| Pencil Harness (*2) | 4H | 2H |
| Abrasion Resistance (*6) | 36 mg/100 cycles | 63 mg/100 cycles |

EXAMPLE 4

Into a mixture of 67.5 parts of methyl methacrylate and 25 parts of trimethylolpropane trimethacrylate, 30 parts of Acryloid (acrylic resin made by Rohm & Haas Co., a trade name) was dissolved to obtain an acrylic resin varnish. A mixture (hereinafter referred to as Control III), of 100 parts of said acrylic varnish and 20 parts of red iron oxide and another mixture (hereinafter referred to as Sample E), of 100 parts of said acrylic resin varnish, 20 parts of red iron oxide and 5 parts of magnesium ammonium phosphate were prepared and were dispersed well for 20 hours by pebble mill. The enamels thus prepared were applied on surface of steel plates treated with zinc to form 40 micron thick films. The coating films were applied with 6 Mrad irradiation in nitrogen gas by the transformer type electron accelerator in the same manner as in Example 1. The results of the tests with regard to the cured films are shown in the following Table 4.

Table 4

| Tests | Sample E | Control III |
|---|---|---|
| Pencil Hardness (*2) | 3H | H |
| Solvent-resistance (*7) | 80 times | 21 times |

Note:
(*7) The coated surface was uniformly rubbed with a piece of xylene soaked cotton gauze untiul the base plate was exposed. Thus the number of rubs was counted.

EXAMPLE 5

A mixture of 1,000 parts of Epikot 1004 (epoxy resin made by Shell Chemical Co., a trade name) and 58.3 parts of acrylic acid was heated with stirring in atmosphere of nitrogen gas. When the temperature of contents reached 130°C, 0.06 parts of hydroquinone and 1.6 parts of tri-n-butylamine were added and the condensation reaction continued at 140°C with abovementioned conditions until the acid value of the mixture reached 2.4. The modified epoxy resin thus obtained was clear. Into a solution mixture of 25 parts of styrene, 25 parts of methyl methacrylate and 50 parts of n-butyl acrylate, 100 parts of the modified epoxy resin obtained was dissolved to obtain a modified epoxy resin varnish.

A mixture (hereinafter referred to as Control IV), consisting of 100 parts of said epoxy varnish and 50 parts of rutile-type titanium dioxide, and another mixture (hereinafter referred to as Sample F) consisting of 100 parts of said epoxy resin varnish, 50 parts of rutile type titanium dioxide and 25 parts of magnesium ammonium phosphate were prepared and were dispersed well for 20 hours by pebble mill. The thus prepared were applied on the surface of steel plates treated with zinc to form 40 micron thick coated films. The coated films were applied with 5 Mrad irradiation in nitrogen gas by the transformer type electron accelerator in the same manner as in Example 1. The results of the tests with regard to the cured films are shown in the following Table 5.

Table 5

| Tests | Sample F | Control IV |
|---|---|---|
| Pencil Hardness (*2) | 3H | 2H |
| Abrasion Resistance (*6) | 38 mg/100 cycles | 20 mg/100 cycles |
| Solvent Resistance (*7) | 70 times | 30 times |

It will be understood from the foregoing Examples that the coating composition of the present invention is far superior to the ordinary, one with respect to several properties, such as abrasion resistance, solvent resistance, adhesion and stain resistance. It should be emphasized, however, that the specific embodiments described and shown herein are intended as merely illustrative and in no way restrictive of the invention.

What is claimed is:

1. In a process of curing a coating composition containing a resin composition having ethylenically unsaturated bonds selected from the group consisting of unsaturated polyester resin, unsaturated acrylic resin, unsaturated epoxy resin and polybutadiene resin, by applying high energy ionizing radiation thereto at a dosage rate sufficient to cure the resin, the improvement which comprises employing as a radiation-cure accelerator from 1–40 percent by weight of at least one compound having the formula $M(NH_4)PO_4 \cdot nH_2O$ in said coating composition wherein M is an element selected from the group consisting of magnesium, calcium and strontium, and n is zero or a positive integer from 1 to 10, in admixture with said resin composition.

2. The process of claim 1 wherein from 5 to 30 weight percent of the compound of the formula $M(NH_4)PO_4 \cdot nH_2O$ is employed.

3. The process of claim 1 wherein from 1 to 20 weight percent of the compound of the formula $M(NH_4)PO_4 \cdot nH_2O$ is employed.

4. The process of claim 1 wherein the compound of the formula $M(NH_4)PO_4 \cdot nH_2O$ is selected from the group consisting of $Mg(NH_4)PO_4 \cdot 6H_2O$, $Ca(NH_4)PO_4 \cdot 7H_2O$ and $Sr(NH_4)PO_4$.

5. The process of claim 1 wherein the compound of the formula $M(NH_4)PO_4 \cdot nH_2O$ is magnesium ammonium phosphate.

* * * * *